United States Patent [19]

Spencer

[11] Patent Number: 4,820,422
[45] Date of Patent: Apr. 11, 1989

[54] METHOD FOR COUNTERING SCALE FORMATION IN FLUID CONDUITS

[75] Inventor: Robert J. Spencer, Dublin, Ireland

[73] Assignee: Envirecon Services Limited, Dublin, Ireland

[21] Appl. No.: 190,143

[22] Filed: May 4, 1988

Related U.S. Application Data

[62] Division of Ser. No. 825,923, Feb. 4, 1986, abandoned.

[30] Foreign Application Priority Data

Feb. 5, 1985 [IE] Ireland .................................. 276/85

[51] Int. Cl.$^4$ .............................................. C02F 5/00
[52] U.S. Cl. .................................................... 210/696
[58] Field of Search ............... 210/617, 618, 695, 696, 210/222, 289

[56] References Cited

U.S. PATENT DOCUMENTS

| 34,455 | 2/1862 | Wilcox | 210/696 X |
|---|---|---|---|
| 2,328,381 | 5/1943 | Jaffe | 235/161 |
| 3,448,034 | 6/1969 | Craft et al. | 204/197 |
| 3,486,999 | 12/1969 | Craft | 204/197 |
| 3,539,509 | 11/1970 | Heitmann et al. | 210/695 |
| 3,866,630 | 2/1975 | Webb et al. | 137/583 |
| 3,883,431 | 5/1975 | Ishii et al. | 210/134 |
| 3,974,071 | 8/1976 | Dunn et al. | 210/696 |
| 4,088,155 | 5/1978 | Echtler | 138/41 |
| 4,250,141 | 2/1981 | Lehmann et al. | 210/289 X |
| 4,351,729 | 9/1982 | Witt | 210/617 X |
| 4,501,661 | 2/1985 | Karasawa | 210/695 X |
| 4,545,909 | 10/1985 | Atkinson et al. | 210/618 |
| 4,725,386 | 2/1988 | Gullas | 210/696 X |

FOREIGN PATENT DOCUMENTS

| 2035289 | 1/1972 | Fed. Rep. of Germany . |
|---|---|---|
| 2422024 | 10/1977 | Fed. Rep. of Germany . |
| 2227491 | 4/1974 | France . |
| 39035 | 7/1978 | Ireland . |
| 846590 | 8/1960 | United Kingdom . |
| 1358330 | 7/1974 | United Kingdom . |
| 2027001 | 2/1980 | United Kingdom . |

*Primary Examiner*—Tom Wyse
*Attorney, Agent, or Firm*—Birch, Stewart, Kolasch & Birch

[57] ABSTRACT

An apparatus for countering scale formation in a fluid flow system comprises a casing adapted for connection into the system and a plurality of substantially spherical metallic members loosely retained within the casing. Preferably, the spherical members comprise an alloy of copper, zinc, nickel and tin.

7 Claims, 1 Drawing Sheet

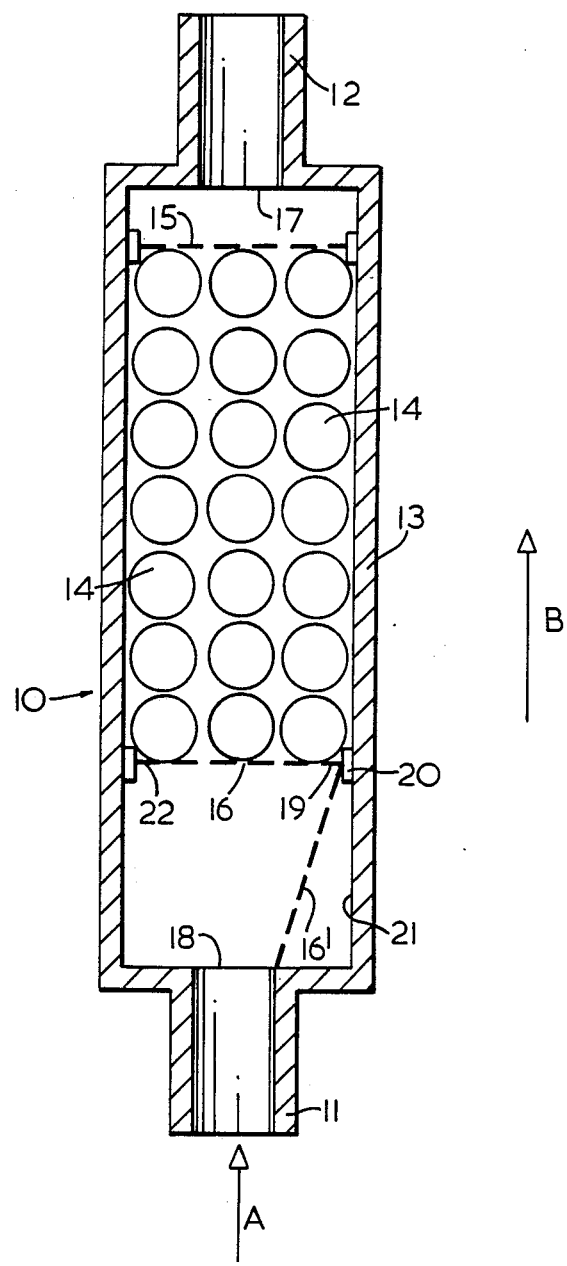

METHOD FOR COUNTERING SCALE FORMATION IN FLUID CONDUITS

This application is a division of application Ser. No. 825,923, filed on Feb. 4, 1986, now abandoned.

BACKGROUND OF THE INVENTION

Field of the Invention

This invention relates to apparatus for countering scale formation in a fluid flow system.

The problem of scale formation in fluid conduits associated with oil wells, water wells, heat exchange systems and steam boilers is well known. In particular, the problem is acute where the mineral content of the fluids flowing in a well system is high, as this results in substantial deposition and scale formation in fluid conduits, pumps and other equipment associated with the well system and this eventually causes operational problems.

A number of solutions to the problem have been proposed, for example, as described in U.S. Pat. Nos. 3,448,034, 3,486,999 and Irish Pat. Specification No. 39035. The elongated rod described in the latter Specification has been found to be most successful. However, one problem with this apparatus is that the elongated rod itself becomes covered with scale after a period of use and thus its effectiveness diminishes over a period of time and eventually stops. Indeed, in some hot water systems where such rods are used at present, it is necessary to use a recirculating pump to minimize scaling of the rod, by pumping the water at sufficient speed to scour the rod surface and prevent scaling.

The reason why the elongated rod becomes covered in scale is not fully understood. However, it has been found that the elongated rod is effective in countering scale formation in fluid conduits until it is itself covered in scale.

Summary of the Invention

It is an object of the present invention to provide an apparatus for countering scale formation in fluid flow systems in which the apparatus is also resistant to scale formation on itself.

According to the invention there is provided an apparatus for countering scale formation in a fluid flow system, comprising a casing adapted for connection into the fluid flow system and a plurality of substantially spherical metallic members loosely retained within the casing.

The substantially spherical members may comprise any metal or alloy suitable for the prevention or reduction of scale formation in fluid conduits, for example, any of the alloys disclosed in the three above mentioned prior art Specifications, and also pure metal zinc or copper. In general, such alloys comprise a number of the following constituents; copper, zinc, nickel, tin, lead, iron, antimony, sulphur, manganese and silicon.

The dimensions of the casing and the collective volume of the substantially spherical members are preferably selected in order to prevent any significant reduction in the pressure, or flow rate, of fluid which in use flows through the casing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus is not limitative of the present invention, and wherein:

The sole drawing is a cross-sectional view of the apparatus according to the present invention.

DETAILED DESCRIPTION OF PREFERRED EMBODIMENTS

Referring now to the drawing there is shown therein a casing generally indicated at 10, the casing having an inlet 11 and an outlet 12 disposed at opposite ends respectively of an intermediate housing 13 whose cross-sectional area is greater than that of the inlet and the outlet. The inlet 11 and outlet 12 are of a suitable diameter for connection, in conventional manner, in a fluid flow system, for example, an oil or water well, or a steam boiler.

The housing 13 has loosely retained therein a plurality of substantially spherical members 14 each of which is made by sand casting an alloy of copper, zinc, nickel and tin. The members 14 are each preferably composed of an alloy in accordance with the percentages given for the elongated rod in Irish Patent Specification No. 39035, or of pure zinc or copper.

The substantially spherical members 14 are retained within the housing 13 by means of two spaced apart perforated plates 15 and 16. The perforated plate 15 is fixed in any conventional manner in the housing 13, and is displaced slightly inwards in the housing 13 from an exit orifice 17. The perforated plate 16 is similarly displaced slightly inwards in the housing 13 from an inlet orifice 18. Further, one end 19 of the perforated plate 16 is fixed by means of a hinge 20 to the interior surface 21 of the housing 13. The free end 22 of the plate 16 may be secured in any conventional manner to the interior surface 21 directly opposite the hinge 20. The perforated plate 16 may thus be pivoted from the closed position shown at 16 to an open position shown at 16' so that the members 14 can be inserted or removed from the casing 10 through the inlet 11 and orifice 18. It will be understood that the shape of the perforated plate 16 will be determined by the shape of the housing 13. For example, if the housing 13 is circular (when viewed in the direction of arrow A) then the perforated plate 16 may have to be oval or some other shape in order to permit it to be opened.

In use, the casing 10 is installed in a fluid flow system (not shown) such as an oil or water well, heat exchange system or a steam boiler, with the housing 13 in a substantially vertical position, as shown in the drawing, so that the fluid has to be pumped upwards in the direction of arrow B through the housing 13. The diameter of the inlet 11 and outlet 12 corresponds to the diameter of the conduit or tubing in the fluid flow system. Further, the inlet 11 and outlet 12 may have external threads (not shown) for installing the casing 10 in the fluid flow system, or the casing 10 may be secured in the fluid flow system in any other suitable manner.

As fluid flows in the system it enters the inlet 11 and thereafter flows into the housing 13 through the orifice 18. The fluid under pressure then flows through the spaces between the members 14, and the members 14 tend to rise upwards in the housing 13. As the housing portion 13 is located in a substantially vertical position, the members 14 will also tend to fall downwards under the force of gravity. Thus, during fluid flow through the casing 10, the members 14 are caused to rub against each other in a substantially random manner. This rubbing action of the members 14 on each other is believed to prevent the members 14 from becoming covered in scale.

Although the fluid flow in the system may in general be laminar, it is thought that in the region of the members 14 the fluid flow is substantially turbulent, thus causing extensive contact between the fluid and the surface of the members 14, so that efficient polarization of the minerals in the fluid occurs.

Furthermore, the substantially spherical shape of the members 14 affords collectively a large surface area for fluid contact. It should also be appreciated, however, that the dimensions of the housing portion 13 and the collective volume of the members 14 are selected in order to prevent any significant reduction in the flow rate, or pressure, of the fluid flowing through the casing 10.

It is thought that the turbulent flow in the region of the members 14 causes instantaneous localized pressure reductions which may have substantially the same effect as the pressure drop across the elongated rod, and in addition causes localized Ph changes on the surface of the alloy and also as a result of the potential difference arising between the pure zinc, the copper and the alloy, as described in Irish Patent Specification No. 39035, i.e. to reduce scaling tendencies and to advantageously influence the size of the precipitates and thus their tendency, or ability, to settle on the equipment surfaces.

The movement of the members 14 against the interior surface 21 of the housing 13 also directly prevents any scale build-up on that surface.

In an alternative embodiment of the invention the members 14 may be magnetised. In a further embodiment of the invention, the perforated plate 16 is fixed in place and thus the members 14 are not removable from the casing 10.

The embodiment of the invention has the following advantages:

First, the use of the substantially spherical members 14 effectively increases the surface area in contact with the fluid, thus increasing the effectiveness of the treatment.

Second, the members 14 may be readily removed and new members inserted after a predetermined period of use. If the members 14 do become scaled over, due for example, to stationary fluid being left in the conduit over a long period of time, then the members 14 may be readily removed and descaled in an acid bath before being re-inserted into the conduit.

Third, the members 14, because of the friction between them, cannot become coated by oxides and calcareous deposits.

While the present invention has been described above in relation to countering scale formation in a fluid flow system it is to be understood that the invention also has application in countering biological fouling in a fluid flow system and the scope of the invention as claimed will be understood accordingly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for countering scale formation in a fluid flow system, said method comprising the steps of:
   connecting into the system a housing having an inlet and an outlet, the housing having a flow cross-sectional area which is substantially greater than that of the inlet and outlet and containing a plurality of substantially spherical shaped members loosely retained therein, said substantially spherical shaped members being formed of an alloy which comprises at least cooper and nickel;
   forcing a fluid through said housing, the orientation of the housing and the direction of fluid flow being such that the fluid flows upwardly through the housing;
   rubbing the substantially spherical shaped members together in a random manner in response to said forcing, said substantially spherical shaped members tending to rise upwardly due to fluid pressure and to fall downwardly under gravity to thereby rub together in a random manner; and
   preventing formation of scale in said fluid flow system, said preventing being in part responsive to at least said rubbing.

2. The method according to claim 1, further compising the step of using an alloy of at least two of copper, zinc, nickel and tin for the substantially spherical shaped members.

3. The method according to claim 1, further comprising the steps of retaining the substantially spherical shaped members loosely within the housing between a pair of perforated plates and disposing each plate inwardly of a respective end of the housing.

4. The method according to claim 3, further comprising the step of permitting removal and replacement of the substantially spherical shaped members by at least one of the plates being hinged to the interior of the housing.

5. The method according to claim 1, further comprising the steps of:
   rubbing some of the substantially spherical shaped members against an interior portion of the housing; and
   aiding preventing formation of scale by said rubbing against the interior portion of the housing.

6. The method according to claim 1, further comprising the step of avoiding coating of said substantially spherical shaped members by at least one of oxides and calcareous deposits in response to at least said rubbing.

7. The method according to claim 1, further comprising the step of using solid members for each of said substantially spherical shaped members whereby said fluid only contacts an outer surface of said substantially spherical shaped members.

* * * * *